United States Patent
Best

(10) Patent No.: US 10,174,481 B2
(45) Date of Patent: Jan. 8, 2019

(54) SHROUD WEAR RING FOR A WORK VEHICLE

(71) Applicant: CNH Industrial America, LLC, New Holland, PA (US)

(72) Inventor: Joseph Best, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/468,461

(22) Filed: Aug. 26, 2014

(65) Prior Publication Data

US 2016/0060844 A1 Mar. 3, 2016

(51) Int. Cl.
| | |
|---|---|
| *B60K 11/00* | (2006.01) |
| *E02F 9/08* | (2006.01) |
| *F04D 29/64* | (2006.01) |
| *F04D 19/00* | (2006.01) |
| *F04D 29/16* | (2006.01) |
| *F04D 29/52* | (2006.01) |
| *B60K 11/06* | (2006.01) |
| *F04D 29/32* | (2006.01) |
| *F04D 29/38* | (2006.01) |

(Continued)

(52) U.S. Cl.
CPC ............ *E02F 9/0866* (2013.01); *B60K 11/06* (2013.01); *F04D 19/002* (2013.01); *F04D 29/164* (2013.01); *F04D 29/326* (2013.01); *F04D 29/38* (2013.01); *F04D 29/526* (2013.01); *F04D 29/642* (2013.01); *F01P 5/06* (2013.01); *F04D 29/023* (2013.01)

(58) Field of Classification Search
CPC .... F01P 5/06; B60K 11/06; E02F 9/08; E02F 9/0866; E02F 9/0858; F04D 19/002; F04D 29/38; F04D 29/326; F04D 29/023; F04D 29/526; F04D 29/164; F04D 29/642

See application file for complete search history.

(56) References Cited

U.S. PATENT DOCUMENTS

| | | | |
|---|---|---|---|
| 3,321,931 A | 5/1967 | Lehmkuhl | |
| 3,799,128 A * | 3/1974 | Small | F01P 5/06 123/41.49 |
| 3,843,278 A | 10/1974 | Torell | |

(Continued)

FOREIGN PATENT DOCUMENTS

| | | |
|---|---|---|
| CN | 101457771 A | 6/2009 |
| EP | 0098397 A1 | 1/1984 |

(Continued)

OTHER PUBLICATIONS

Sulzer—High Efficiency and Reduce Emissions with High Pressure (4 Pages) Dated Annual Resuts Presentation 2011.

(Continued)

*Primary Examiner* — James M Dolak
(74) *Attorney, Agent, or Firm* — Peter K. Zacharias; Patrick M. Sheldrake

(57) ABSTRACT

A fan assembly for a work vehicle includes a fan shroud defining an opening and a fan. The fan includes a rotor and one or more blades extending outwardly along a radial direction from the rotor. The fan assembly additionally includes a wear ring attached to the fan shroud and extending inwardly along the radial direction. The wear ring is configured to interact with tips of the blades to increase an efficiency of the fan assembly.

10 Claims, 5 Drawing Sheets

(51) Int. Cl.
*F01P 5/06* (2006.01)
*F04D 29/02* (2006.01)

(56) References Cited

U.S. PATENT DOCUMENTS

| | | | | |
|---|---|---|---|---|
| 4,329,946 A * | 5/1982 | Longhouse | ............... | F01P 5/06 |
| | | | | 123/41.49 |
| 4,398,508 A * | 8/1983 | Moon | ................... | F01D 11/127 |
| | | | | 123/41.49 |
| 4,526,509 A * | 7/1985 | Gay, Jr. | ................... | F01D 11/12 |
| | | | | 277/413 |
| 4,566,700 A * | 1/1986 | Shiembob | ............... | C23C 28/00 |
| | | | | 277/415 |
| 4,962,734 A * | 10/1990 | Jorgensen | ................ | F01P 5/04 |
| | | | | 123/41.12 |
| 5,941,685 A | 8/1999 | Bagepalli et al. | | |
| 5,961,125 A | 10/1999 | Wolfe et al. | | |
| 6,251,526 B1 | 6/2001 | Staub | | |
| 6,454,527 B2 | 9/2002 | Nishiyama et al. | | |
| 6,457,939 B2 | 10/2002 | Ghasripoor et al. | | |
| 6,508,624 B2 * | 1/2003 | Nadeau | ................... | F01D 5/225 |
| | | | | 415/173.3 |
| 6,874,990 B2 | 4/2005 | Nadeau | | |
| 6,887,528 B2 | 5/2005 | Lau et al. | | |
| 7,114,921 B2 | 10/2006 | Iwasaki et al. | | |
| 7,241,108 B2 * | 7/2007 | Lewis | ....................... | F01D 5/20 |
| | | | | 415/173.4 |
| 7,256,512 B1 | 8/2007 | Marquiss | | |
| 7,399,157 B2 * | 7/2008 | Tonhaeuser | ............... | F01P 5/06 |
| | | | | 277/553 |
| 7,481,615 B2 * | 1/2009 | Park | ...................... | F04D 29/164 |
| | | | | 123/41.49 |
| 7,789,622 B2 * | 9/2010 | Acre | ..................... | F04D 29/164 |
| | | | | 415/209.3 |
| 7,980,813 B2 | 7/2011 | Medynski et al. | | |
| 8,061,967 B2 * | 11/2011 | Marlin | .................. | F01D 21/045 |
| | | | | 415/9 |
| 8,105,039 B1 * | 1/2012 | El-Aini | ................. | F01D 11/008 |
| | | | | 416/195 |
| 8,221,074 B2 * | 7/2012 | Nelson | .................. | F04D 29/526 |
| | | | | 415/213.1 |
| 8,303,244 B2 * | 11/2012 | Alexander | ............ | F04D 29/526 |
| | | | | 415/119 |
| 8,459,967 B2 * | 6/2013 | Kleber | .................. | F04D 29/164 |
| | | | | 417/423.14 |
| 8,714,116 B2 | 5/2014 | Hartman et al. | | |
| 8,714,921 B2 * | 5/2014 | Tembreull | ................ | F01P 11/10 |
| | | | | 415/208.1 |
| 9,180,772 B2 * | 11/2015 | Durello | .................. | B60K 11/02 |
| 9,651,059 B2 * | 5/2017 | Robertson, Jr. | ........ | F04D 29/526 |
| 9,702,375 B2 * | 7/2017 | Costa | .................... | F04D 29/644 |
| 9,714,606 B2 * | 7/2017 | Yamada | ................. | F02B 53/14 |
| 9,752,593 B2 * | 9/2017 | Bagnall | ................. | F04D 29/526 |
| 9,765,794 B2 * | 9/2017 | Findeisen | ............. | F04D 29/325 |
| 9,777,599 B2 * | 10/2017 | Radomski | ............. | F01D 11/122 |
| 9,784,277 B2 * | 10/2017 | Scouarnec | ............ | F04D 19/002 |
| 9,790,954 B2 * | 10/2017 | Turcas | .................. | F04D 29/326 |
| 9,803,645 B2 * | 10/2017 | Ota | ........................ | F04D 19/002 |
| 9,829,010 B2 * | 11/2017 | Yoshida | ................ | F04D 29/164 |
| 2006/0147304 A1 * | 7/2006 | Cho | ........................ | F04D 29/544 |
| | | | | 415/191 |
| 2006/0216147 A1 | 9/2006 | Park | | |
| 2011/0164962 A1 | 7/2011 | Wilson, Jr. et al. | | |
| 2012/0128494 A1 | 5/2012 | Pelley et al. | | |
| 2013/0004305 A1 | 1/2013 | Giovannetti et al. | | |

FOREIGN PATENT DOCUMENTS

| | | |
|---|---|---|
| KR | 101202476 B1 | 11/2012 |
| WO | WO 9303299 A1 | 2/1993 |

OTHER PUBLICATIONS

Kingsland Marine Website www.kingslandreachmarina.com/wear_ring.html (1 Page) Dated Jul. 15, 2014.
Hudson Products Corporation—Husdon Tip Seal Installation Manual (6 Pages) Dated Dec. 2000.
Extended European Search Report for EP15182191.5, dated Jan. 20, 2016 (6 pages).

* cited by examiner

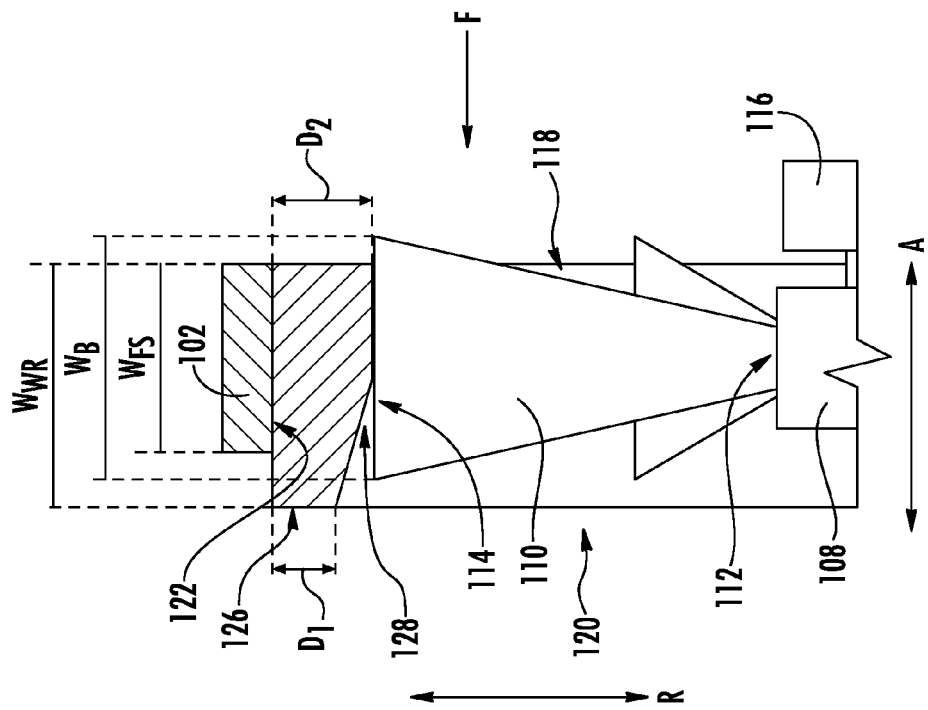
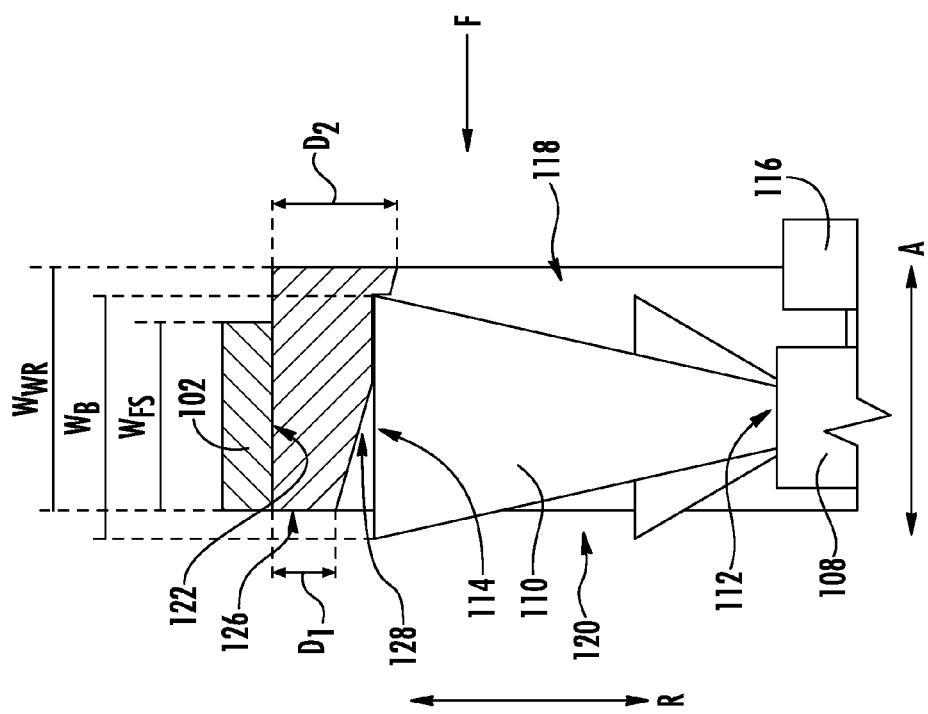

SHROUD WEAR RING FOR A WORK VEHICLE

FIELD OF THE INVENTION

The present disclosure generally relates to a fan assembly for a work vehicle, or more particularly, to a shroud wear ring of a fan assembly for a work vehicle.

BACKGROUND OF THE INVENTION

Off-highway work vehicles, such as tractors, front-end loaders, and the like, have been developed for many purposes and generally include an engine, a transmission, and various other drivetrain components attached to a chassis. The engine in such a work vehicle may be cooled in a variety of ways depending at least in part on the size and/or type of engine included. For example, the work vehicle may include a radiator for removing heat from a coolant that flows through or around at least a portion of the engine. An airflow can be provided across the radiator by a fan assembly to increase an amount of heat removed from the coolant. The fan assembly can include a fan shroud and a fan, the fan shroud defining an opening and the fan including a rotor and blades positioned in the opening.

During operation of the work vehicle, certain components of the work vehicle, potentially including the chassis and the fan shroud, may "flex" or deform due in part to the various terrains and/or work load demands of the work vehicle. In order to avoid damage to the blades of the fan assembly that may occur if the blades contact the fan shroud, the fan assembly generally defines a clearance between the opening of the fan shroud and the tips of the blades. The clearance is typically greater than 5% of a diameter of the fan.

Certain problems may exist, however, with such a configuration. For example, the clearance required to prevent damage during flex of the shroud assembly may decrease an efficiency of the fan assembly by allowing a portion of the air forced through the opening of the fan shroud to swirl around the blade tips opposite a flow direction of the fan assembly. Additionally, the clearance may increase an amount of noise produced by the fan assembly during operation.

Attempts to increase the efficiency of the fan assembly in a work vehicle have included adding a nylon brush mechanism that extends inwardly from the fan shroud towards the tips of the blades. However, such a configuration may fail to prevent an amount of swirl around the tips of the blades, and may also fail to effectively reduce an amount of noise produced by the fan assembly.

Accordingly, a mechanism for increasing an efficiency of a fan assembly for a work vehicle and reducing an amount of noise created by the same would be useful. Moreover, a mechanism that is capable of increasing a fan assembly's efficiency and reducing the amount of noise produced by the fan assembly, while still protecting the fan assembly from damage, would be particularly beneficial.

BRIEF DESCRIPTION OF THE INVENTION

Aspects and advantages of the invention are set forth below in the following description, or may be obvious from the description, or may be learned through practice of the invention.

In one exemplary embodiment, a fan assembly for a work vehicle is provided. The fan assembly defines an axial direction, a radial direction, and a circumferential direction and includes a fan shroud defining an opening. The opening extends along the axial direction between an air inlet and an air outlet. Additionally, the opening defines an inner surface between the air inlet and the air outlet. The fan assembly also includes a rotor rotatably positioned at least partially in the opening of the fan shroud and extending along the axial direction and one or more blades attached to the rotor. Each blade extends outwardly along the radial direction from a base positioned adjacent to the rotor to a tip. The fan assembly also includes a wear ring attached to the fan shroud and positioned adjacent to the inner surface of the opening. The wear ring extends from the inner surface of the opening along the radial direction inwardly. Additionally, the wear ring is configured to interact with the tip of each blade to increase an efficiency of the fan assembly.

In another exemplary embodiment, a work vehicle is provided, the work vehicle including a chassis, a drivetrain attached to the chassis including an engine and a transmission, and a fan assembly positioned adjacent to the engine. The fan assembly defines an axial direction, a radial direction, and a circumferential direction. Additionally, the fan assembly includes a fan shroud defining an opening. The opening extends along the axial direction between an air inlet and an air outlet. Additionally, the opening defines an inner surface between the air inlet and the air outlet. The fan assembly also includes a rotor rotatably positioned at least partially in the opening of the fan shroud and extending along the axial direction and one or more blades attached to the rotor. Each blade extends outwardly along the radial direction from a base positioned adjacent to the rotor to a tip. The fan assembly also includes a wear ring attached to the fan shroud and positioned adjacent to the inner surface of the opening. The wear ring extends from the inner surface of the opening along the radial direction inwardly. Additionally, the wear ring is configured to interact with the tip of each blade to increase an efficiency of the fan assembly.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 7 provides a cross-sectional schematic view of certain components of a fan assembly in accordance with an exemplary embodiment of the present disclosure, with the wear ring in a first position; and FIG. 8 provides a cross-sectional schematic view of certain components of the exemplary fan assembly of FIG. 7, with the wear ring in a second position.

DETAILED DESCRIPTION OF THE INVENTION

Figure 1:
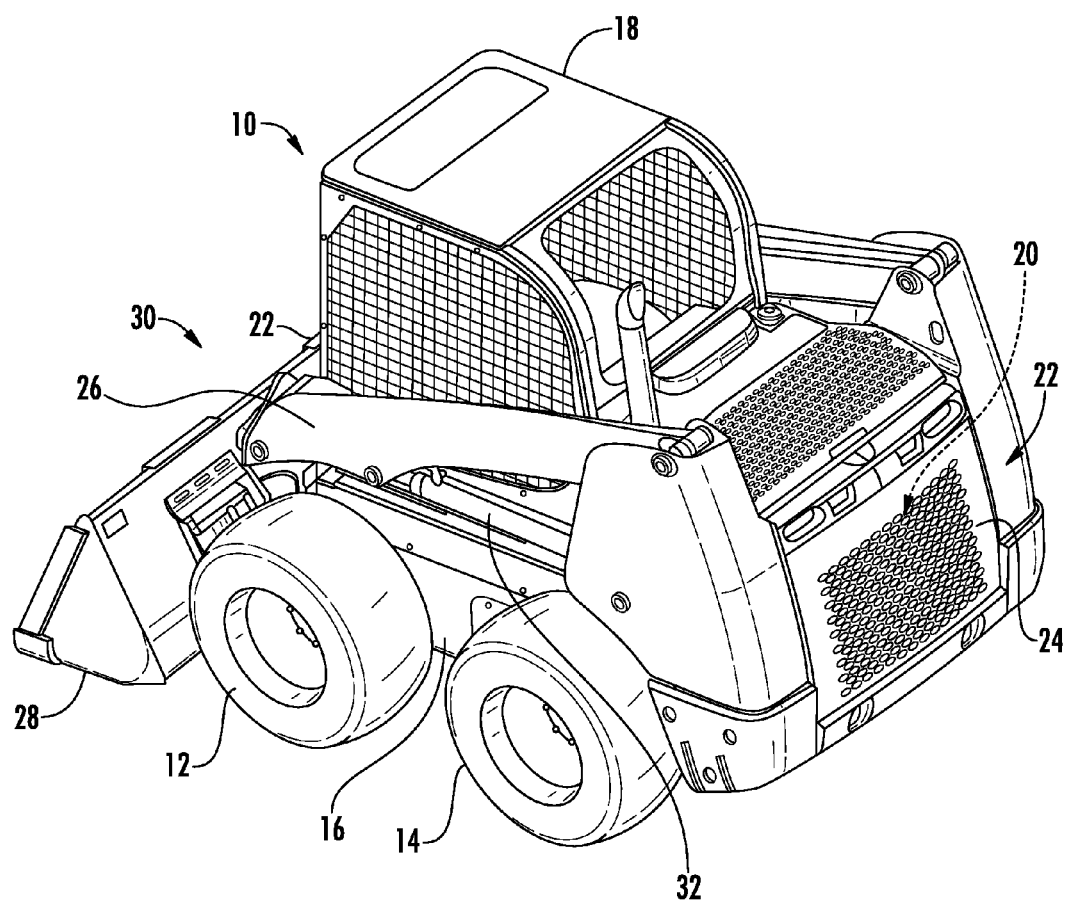
FIG. 1 provides a perspective view of one embodiment of a work vehicle in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a work vehicle 10. As shown, the work vehicle 10 is configured as a skid steer loader. However, in other embodiments, the work vehicle 10 may be configured as any other suitable work vehicle known in the art, such as various agricultural vehicles, front-end loaders, earth-moving vehicles, road vehicles, all-terrain vehicles, off-road vehicles and/or the like.

As shown, the exemplary work vehicle 10 includes a pair of front wheels 12, a pair of rear wheels 14, and a chassis 16 coupled to and supported by the wheels 12, 14. An operator's cab 18 is supported by a portion of the chassis 16 and may house various input devices, such as one or more speed control lever(s) and one or more lift/tilt lever(s) (not shown) for permitting an operator to control the operation of the work vehicle 10. In addition, the work vehicle 10 includes an engine 20 coupled to or otherwise supported by the chassis 16 and positioned generally at a rear end 22 of the work vehicle 10. A grill 24 is positioned at the rear end 22 of the work vehicle 10, proximate to the engine 20 of the work vehicle 10 to allow airflow therethrough. As will be discussed below, the work vehicle may include a fan assembly 100 (FIG. 2) positioned adjacent to the engine 20 to draw air over the engine 20 and cool the engine 20. Moreover, in certain exemplary embodiments, the work vehicle 10 may also include a radiator (not shown) positioned between the fan assembly 100 and the grill 24 to remove heat from a coolant that flows through the engine 20 during operation of the work vehicle 10.

In certain exemplary embodiments, the fan assembly 100 (FIG. 2) may be the primary source of airflow to the engine 20 of the work vehicle 10. For example, in the work vehicle 10 of FIG. 1, the engine 20 is positioned at the rear end 22 of the work vehicle 10 and thus is not positioned to receive an airflow generated from, e.g., a forward movement of the work vehicle 10.

Still referring to FIG. 1, the exemplary work vehicle 10 additionally includes a pair of loader arms 26 coupled between the chassis 16 and a suitable implement 28 (e.g., a bucket, fork, blade and/or the like) positioned at a front end 30 of the work vehicle 10. Hydraulic cylinders may also be coupled between the chassis 16 and the loader arms 26 and between the loader arms 26 and the implement 28 to allow the implement 28 to be raised/lowered and/or pivoted relative to the ground. For example, a raising cylinder 32 may be coupled between the chassis 16 and each loader arm 26 for raising and lowering the loader arms 26, thereby controlling the height of the implement 28 relative to the ground. Additionally, a tilt cylinder (not shown) may be coupled between each loader arm 26 and the implement 28 for pivoting the implement 28 relative to the loader arms 26, thereby controlling the tilt or pivot angle of the implement 28 relative to the ground.

It should be appreciated, however, that the work vehicle 10 depicted in FIG. 1 is provided by way of example only, and that in other exemplary embodiments, the work vehicle 10 may have any other suitable configuration.

Figure 2:
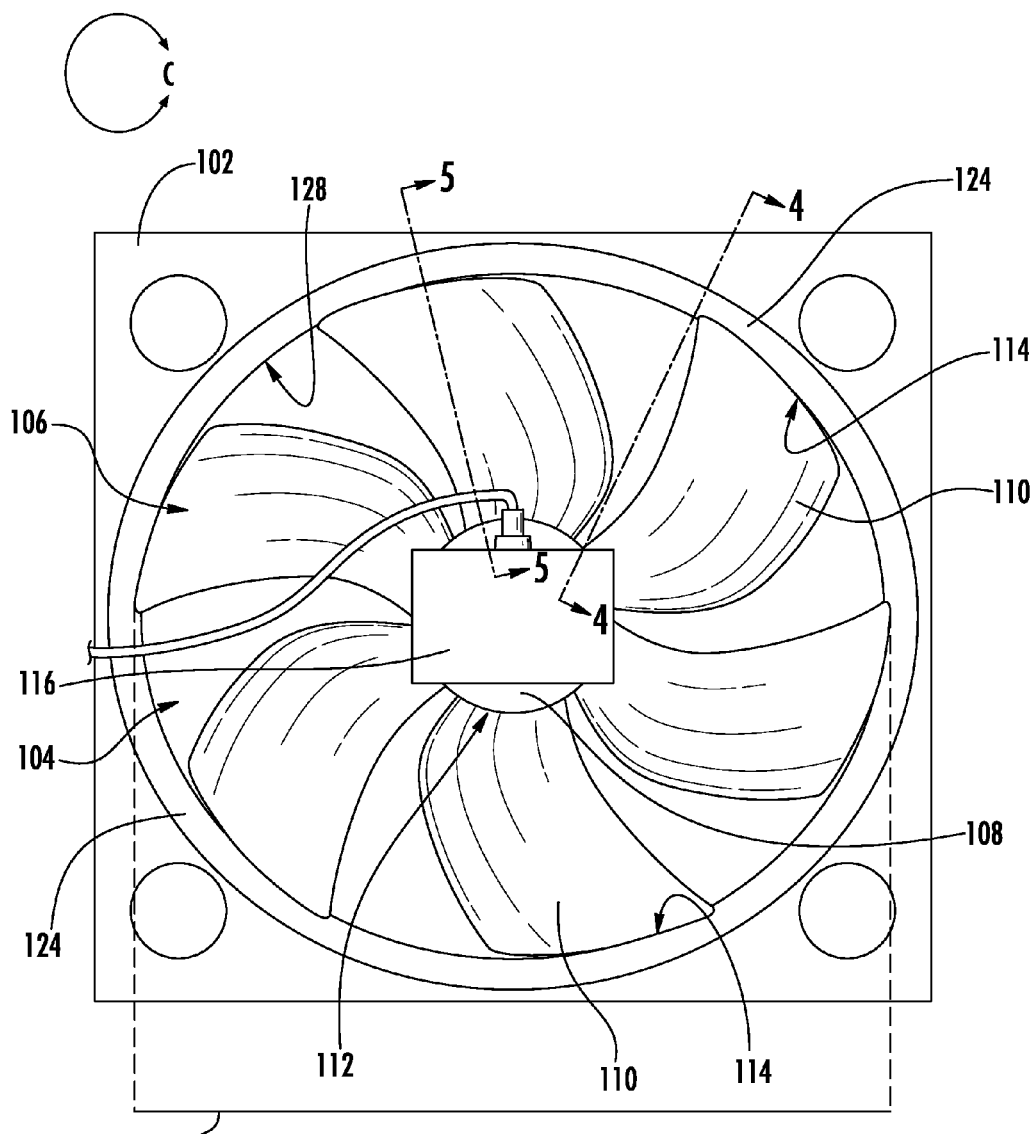
FIG. 2 provides a front view of a fan assembly in accordance with an exemplary embodiment of the present disclosure.
Figure 3:
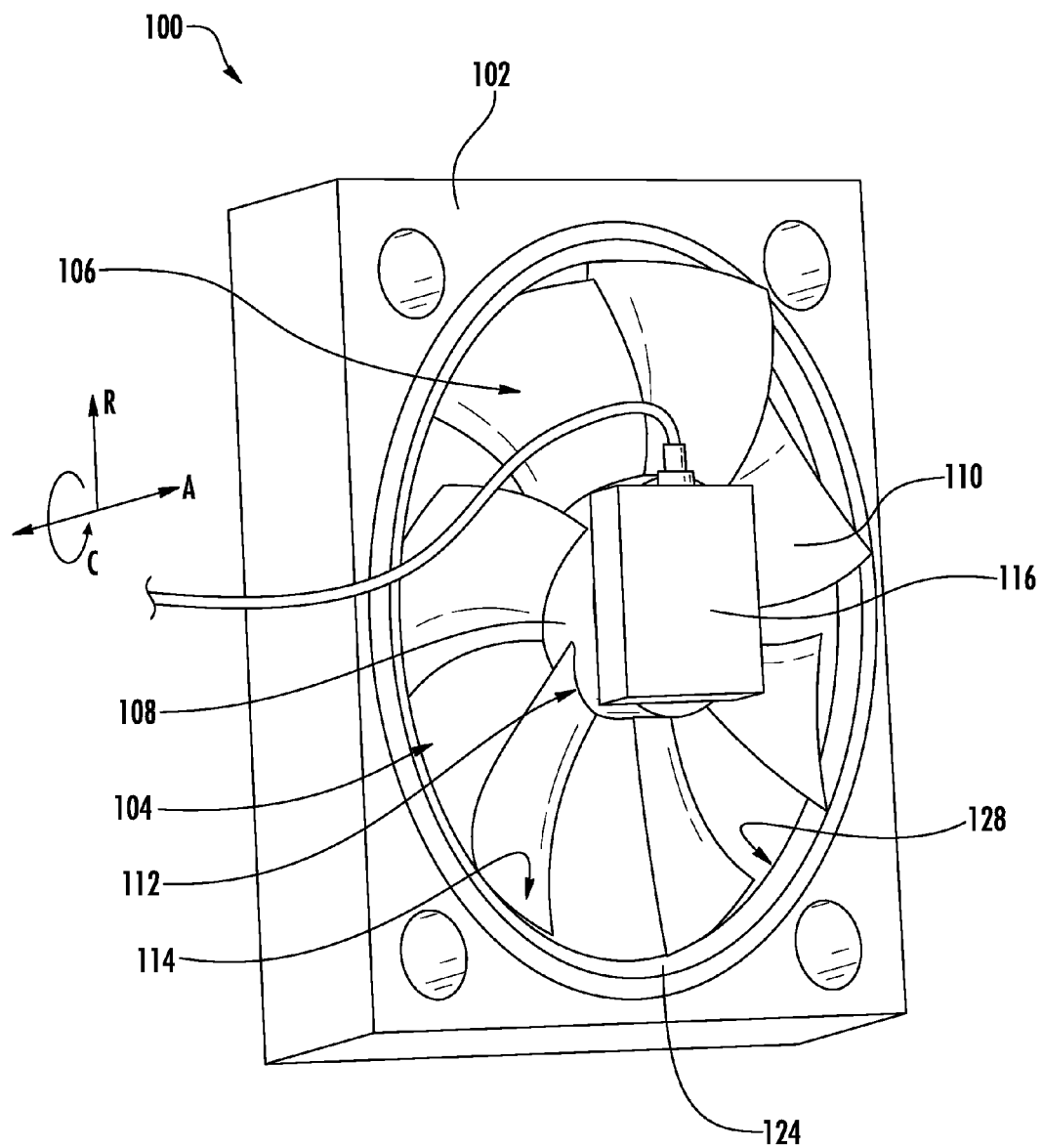
FIG. 3 provides a perspective view of the exemplary fan assembly of FIG. 2.

Referring now to FIGS. 2-3, FIG. 2 provides a front view of a fan assembly 100 in accordance with an exemplary embodiment of the present disclosure; and FIG. 3 provides a perspective view of the fan assembly 100 of FIG. 2.

The exemplary fan assembly 100 defines an axial direction A, a radial direction R, and a circumferential direction C (FIG. 3). Additionally, the fan assembly 100 depicted includes a fan shroud 102 defining an opening 104 extending along the axial direction A. The opening 104 defines a substantially circular shape when viewed along the axial direction A. For the exemplary embodiment depicted in FIGS. 2-3, the fan shroud 102 is comprised of a single molded part. However, in other exemplary embodiments, the fan shroud 102 may instead be comprised of a plurality of individually molded components joined together in any suitable manner. For example, in certain exemplary embodiments, a first portion of the fan shroud 102, e.g., a top half, may be made independently from a second portion of the fan shroud 102, e.g., a bottom half. In such an exemplary embodiment, the first and second portions may be attached in any suitable manner, such as, for example, by being bolted together, welded together, or a combination thereof.

The fan assembly 100 also includes a fan 106 positioned at least partially within the opening 104 of the fan shroud 102. The fan 106 includes a rotor 108 rotatably positioned at least partially in the opening 104 of the fan shroud 102 and extending along the axial direction A along with the opening 104 of the fan shroud 102. One or more blades 110 are attached to the rotor 108 and spaced around the rotor 108 along the circumferential direction C. Each of the blades 110 extend outwardly along the radial direction R from a base 112 to a tip 114. For the exemplary embodiment depicted in FIGS. 2-3, the fan assembly 100 includes six (6) blades 110 evenly spaced along the circumferential direction C. However, in other exemplary embodiments, the fan assembly 100 may instead include any suitable number of blades 110, with any suitable spacing along the circumferential direction C, e.g., evenly spaced or irregularly spaced. Additionally, in other embodiments, the blades 110 may define any suitable blade geometry, such as straight, tapered, or curved; may be attached to the rotor 108 in any suitable fashion; may define any suitable thickness; may be comprised of any suitable material; and may include one or more suitable coatings or laminations.

A motor 116 is mounted adjacent to the rotor 108 and is in electrical communication with a power source (not shown). The motor 116 is mechanically coupled to the rotor 108 to provide rotational force to the rotor 108 and drive the fan 106. Moreover, as may be more clearly seen in FIG. 3, each of the blades 110 defines a slope relative to the axial direction A, such that when the rotor 108 is rotated about the axial direction A by the motor 116, the blades 110 create a flow of air through the opening 104 of the fan shroud 102 (see airflow F in FIG. 4). It should be appreciated, however, that the fan assembly 100 depicted in FIGS. 2-3 is provided by way of example only. In other exemplary embodiments, for example, the motor 116 may be configured in any suitable position, and additionally or alternatively, the fan assembly 100 may include any other electrical, mechanical, or electromechanical driving means for the fan assembly 100.

Figure 4:
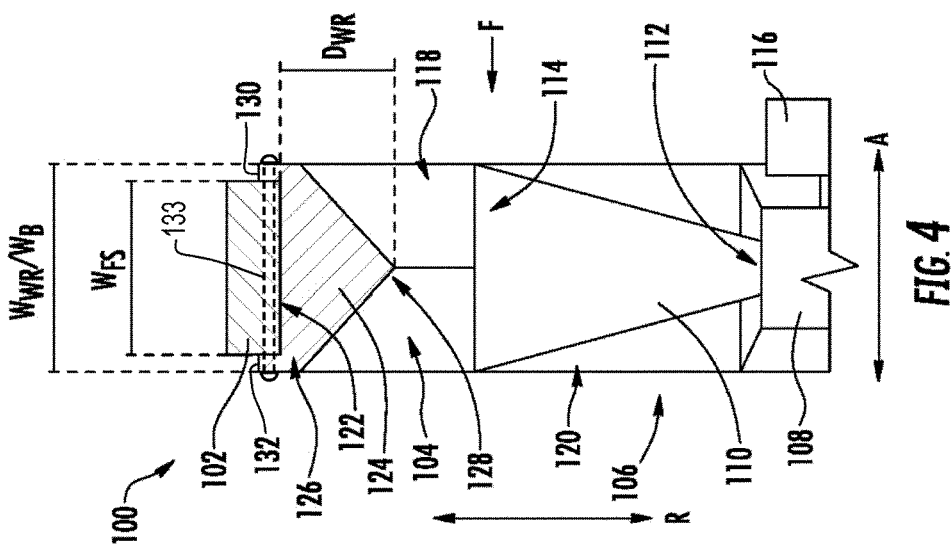
FIG. 4 provides a cross-sectional schematic view of certain components of the exemplary fan assembly of FIG. 2 along Line 4-4 in FIG. 2.

Referring now also to FIG. 4, a cross-sectional schematic view of certain components of the exemplary fan assembly of FIG. 2 along Line 4-4 in FIG. 2 is provided. As is depicted, the opening 104 of the fan shroud 102 extends along the axial direction A between an air inlet 118 and an air outlet 120. Additionally, the fan assembly 100 defines a flow direction F of air through the fan assembly 100 from the air inlet 118 to the air outlet 120. Moreover, the opening 104 defines an inner surface 122 extending along the axial direction A between the air inlet 118 and the air outlet 120 and along the circumferential direction C.

As is also depicted in FIGS. 2-4, the fan assembly 100 includes a wear ring 124 attached to the fan shroud 102 and positioned adjacent to the inner surface 122 of the opening 104. The wear ring 124 extends from the inner surface 122 of the opening 104 inwardly along the radial direction R towards the plurality of blades 110. More particularly, the wear ring 124 defines a base 126, a radially inner end 128, and a depth, $D_{WR}$, therebetween. The depth $D_{WR}$ may, in certain exemplary embodiment be equal to or greater than approximately about 5% of a diameter $D_F$ of the fan 106. However, in other exemplary embodiment, the depth $D_{WR}$ may instead be greater than or equal to approximately 4% of the diameter $D_F$ of the fan 106 or greater than or equal to approximately 3% of the diameter $D_F$ of the fan 106.

Referring still to the exemplary embodiment of FIGS. 2-4, the base 126 of the wear ring 124 defines a U-shaped cross-section (FIG. 4) configured to be attached to the fan shroud 102. The U-shaped base 126 defines an upstream lip 130 and a downstream lip 132. The upstream lip130 is configured to wrap around a portion of the fan shroud 102 at the air inlet 118 and the downstream lip 132 is configured to wrap around a portion of the fan shroud 102 at the air outlet 120. The wear ring 124 may be attached to the fan shroud 102 using a plurality of rivets 133, only one of which is shown in FIG. 4, positioned circumferentially along the upstream and/or downstream lips 130, 132 of the base 126 of the wear ring 124. However, in other exemplary embodiments the wear ring 124 may instead or in addition be attached to the fan shroud 102 in any other suitable manner. For example, in certain embodiments the wear ring 124 may be affixed to the inner surface 122 of the opening 104 of the fan shroud 102 using a suitable glue or epoxy. Moreover, in still other exemplary embodiments, the base 126 of the war ring 124 may define any other suitable shape for attachment to the fan shroud 102.

Referring now particularly to FIG. 4, the wear ring 124 additionally defines a width $W_{WR}$ along the axial direction A that is approximately equal to a width $W_B$ of the blades 110 along the axial direction A. Additionally, for the embodiment of FIG. 4, the widths $W_{WR}$ of the wear ring 124 and $W_B$ of the blades 110 are each wider than a width $W_{FS}$ of the fan shroud 102 along the axial direction A. However, in other exemplary embodiments, the fan shroud 102 may define any other suitable width relative to the wear ring 124 and/or the blades 110.

The wear ring 124 extends along the circumferential direction C along an entire circumference of the opening 104, or more particularly, along the entire inner surface 122 of the opening 104. Accordingly, the wear ring 124 also defines a circular shape when viewed along the axial direction A (see FIG. 2). Additionally, the wear ring 124 is configured to interact with the tips 114 of the blades 110 to, e.g., increase an efficiency of the fan assembly 100 and reduce an amount of noise generated during operation of the fan assembly 100. For the exemplary embodiment depicted, the wear ring 124 defines a triangular-shaped radially inner end 128 configured to interact with the tips 114 of the blades 110. However, as will be discussed below the shape of radially inner end 128 of the wear ring 124 may change during use. Moreover, in other exemplary embodiments, the radially inner end may define any other suitable shape, such as a circular or ovular shape, a squared shaped, a tiered shaped, etc.

Figure 6:
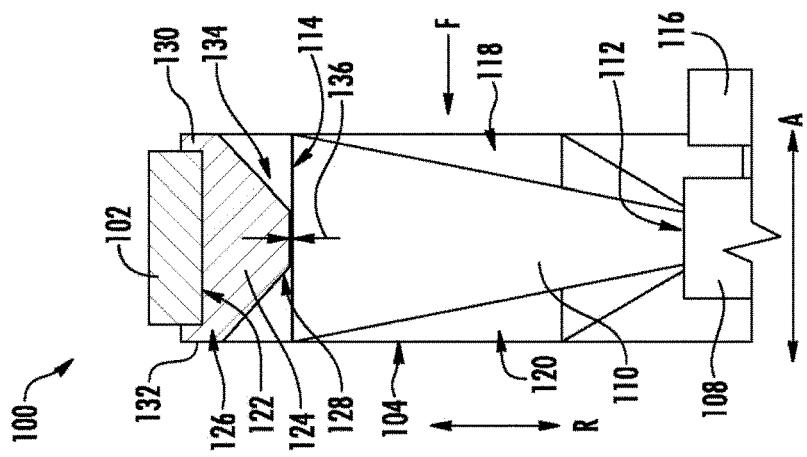
FIG. 6 provides a cross-sectional schematic view of certain components of the exemplary fan assembly of FIG. 2 along Line 5-5 in FIG. 2, with the wear ring worn down.
Figure 5:
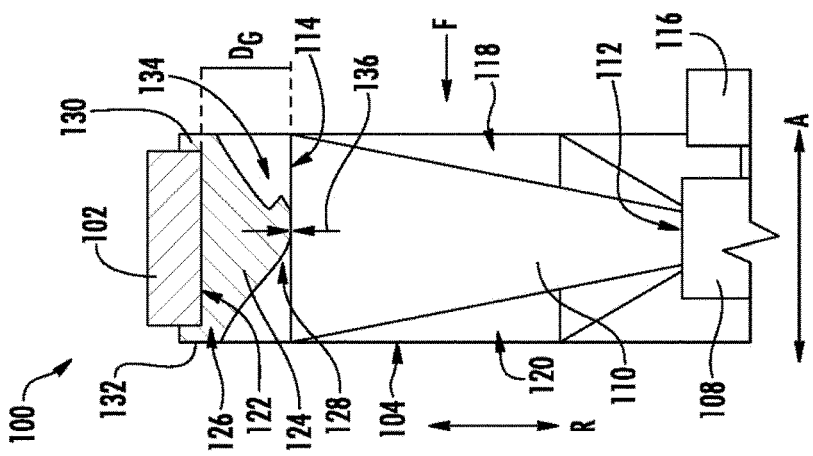
FIG. 5 provides a cross-sectional schematic view of certain components of the exemplary fan assembly of FIG. 2 along Line 5-5 in FIG. 2, with the wear ring deformed.

Referring now to FIGS. 5 and 6, operation of the wear ring 124 will now be described in greater detail. FIG. 5 provides a cross-sectional schematic view of certain components of the exemplary fan assembly 100 of FIG. 2 along Line 5-5 in FIG. 2, with the wear ring 124 deformed. For the exemplary embodiment of FIG. 5, the fan assembly 100 further defines a gap 134 along the radial direction R between the tips 114 of the blades 110 and the radially inner end 128 of the wear ring 124. The gap 134 defines a depth $D_G$ along the radial direction R. The depth $D_{WR}$ of the wear ring 124 (FIG. 4) may initially be greater than the depth $D_G$ of the gap 134. For the exemplary embodiment depicted in FIG. 5, the wear ring 124 is configured to deform when initially contacted with the tips 114 of the blades 110. For example, such initial contact may be subsequent to an installation of the wear ring 124 in the fan assembly 100, or alternatively during a deformation or flex of the fan shroud 102.

A deformation of the fan shroud 102 may be in response to an external force on the fan assembly 100, such as a force translated through the work vehicle 10 as a result of stress or strain being exerted on or by the work vehicle 10. These external forces may cause the fan shroud 102 to "flex" or temporarily deform, causing the opening 104 of the fan shroud 102 to temporarily define a non-circular shape when viewed along the axial direction A. If this flex occurs during the operation of the fan assembly 100, the depth $D_G$ of the gap 134 defined between the tips 114 of the blades 110 and the inner surface 122 of the opening 104 may be temporarily be decreased in certain areas. To accommodate these temporary decreases in the depth $D_G$ of the gap 134, the wear ring 124 is configured to bend, or fold over at the radially inner end 128, as is depicted in FIG. 5. In such a case, the wear ring 124 may not wear down immediately, or may only wear down a minimal amount, such that the temporary contact with the tips 114 of the blades 110 does not permanently alter the shape of the wear ring 124 when viewed along the axial direction A.

With reference now to FIG. 6, a cross-sectional schematic view of certain components of the exemplary fan assembly 100 of FIG. 2 is provided along Line 5-5 in FIG. 2, with the wear ring 124 worn down. The radially inner end 128 of the wear ring 124 is configured to be worn down by the tips 114 of the blades 110 through repeated contact with the tips 114 of the blades 110. More particularly, the wear ring 124 is comprised of a material configured to wear gradually when repeatedly contacted by the tips 114 of the blades 110.

Although the depth $D_{WR}$ of the wear ring 124 may initially be greater than the depth $D_G$ of the gap 134, repeated contact with the tips 114 of the blades 110, may cause the wear ring 124 to wear down, such that the depth $D_{WR}$ of the wear ring 124 is approximately equal to the depth $D_G$ of the gap 134. More particularly, the radially inner end 128 of the wear ring 124 is configured to be worn down such that a clearance 136 between the wear ring 124 and the tips 114 of the blades 110 along the radial direction R approaches 0 mm. Accordingly, in such an exemplary embodiment, the fan assembly 100 may define a clearance 136 in the radial direction R of less than about three (3) percent of the diameter $D_F$ of the fan 106 (see FIG. 2). Alternatively, in other exemplary embodiments, the fan assembly 100 may instead define a clearance 136 of less than about two (2) percent, or less than about one (1) percent of the diameter $D_F$ of the fan 106. As used herein, terms of approximation, such as "about" or "approximately," refer to being within a 10% margin of error.

The wear ring 124 described above with reference to the Figs. may be formed in any suitable manner, such as by injection molding. The wear ring 124 may be molded as a single circular piece, or alternatively may be made in sections assembled and/or joined in any suitable manner. Moreover, the wear ring 124 may be made of a thermoplastic polyethylene material, such as an ultra-high molecular weight polyethylene material. It should be appreciated, however, that in other embodiments, the wear ring 124 may instead be made of any other suitable material configured to allow for the flexibility discussed above with respect to FIG. 5, and the wear properties discussed above with respect to FIG. 6.

The wear ring 124 described herein may increase an efficiency of the fan assembly 100 by preventing or minimizing an amount of air from recirculating around the tips 114 of the blades 110 within the opening 104 during operation of the fan assembly 100. Moreover, the wear ring 124 described herein may minimize an amount of noise generated by the fan assembly 100 during operation of the fan assembly 100. For example, the wear ring 124 described with reference to FIGS. 5 and 6 may form a profile during operation of the fan assembly 100, when viewed along the axial direction A (such as in FIG. 2), with a clearance 136 defined between the tips of the blades and the wear ring 124 that approaches 0 mm. The above benefits may be provided while reducing a risk of damage to the fan assembly 100 during a flex or deformation of the fan assembly 100.

Moreover, in certain exemplary embodiments, such as when, for example, the fan shroud 102 is comprised of two or more parts, the opening 104 may not define a perfectly circular shape when viewed along the axial direction A. Accordingly, the wear ring 124 may account for these imperfections by allowing a portion of the wear ring 124 to be worn down to match a path of the tips 114 of the blades 110 of the fan assembly 100.

Referring now to FIGS. 7 and 8, another exemplary embodiment of the present disclosure is provided. More particularly, FIG. 7 provides a cross-sectional schematic view of certain components of a fan assembly 100 in accordance with the present disclosure with the wear ring 124 in a first position, and FIG. 8 provides a cross-sectional schematic view of certain components of the fan assembly 100 of FIG. 7 with the wear ring 124 in a second position. For the embodiment depicted, the wear ring 124 generally defines a radially inner end 128 that defines a slope relative to the axial direction A. Accordingly, the wear ring 124 defines a first depth $D_1$ at a downstream end that is less than a depth $D_2$ at an upstream end. The depth $D_2$ is greater than the depth $D_G$ of the gap 134.

Additionally, for the embodiment of FIGS. 7-8, the wear ring 124 defines a width $W_{WR}$ that is greater than the width $W_B$ of the blades 110. For example, as is depicted in FIG. 7, in the first position the wear ring 124 may extend past the fan shroud 124 and blades 110 at the air inlet 118 of the fan assembly 100. Over time, e.g., as the wear ring 124 is worn down by repeated contact with the tips 114 of the blades 110, the wear ring 124 may be moved along the axial direction A in the flow direction F to the second position, as is depicted in FIG. 8. In the second position, by contrast, the wear ring 124 may extend past the fan shroud 124 and blades 110 at the air outlet 120 of the fan assembly 100. The wear ring 124 may be moveably and/or slidably attached to the fan shroud 102 to allow such functionality. Moreover, the wear ring 124 may be configured to allow a user to, e.g., periodically move the wear ring 124 along the axial direction A. Alternatively, the wear ring 124 may be configured to automatically slide along the axial direction A as it interacts with the tips 114 of the blades 110.

Such a configuration may allow the wear ring 124 to provide a seal for the fan assembly 100 over a greater length of time, and may allow the user to "tune-up" the fan assembly 100 without replacing the wear ring 124.

It should be appreciated, however, that in still other exemplary embodiments, the wear ring 124 may instead be configured to be moved in an opposite direction of the flow direction F, such that the wear ring 124 extends past the fan shroud 124 and blades 110 at the air outlet 120 of the fan assembly 100 when in the first position. Moreover, in other exemplary embodiments, the wear ring 124 may not define a slope relative to the axial direction A, and as such, the first depth $D_1$ of the wear ring 124 may be approximately equal to the second depth $D_2$ of the wear ring 124.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A fan assembly for a work vehicle defining an axial direction, a radial direction, and a circumferential direction, the fan assembly comprising:

a fan shroud defining an opening extending along the axial direction between an air inlet and an air outlet, the opening defining an inner surface between the air inlet and the air outlet;

a rotor rotatably positioned at least partially in the opening of the fan shroud and extending along the axial direction;

one or more blades attached to the rotor, each blade extending outwardly along the radial direction from a base positioned adjacent to the rotor to a tip; and a wear ring attached to the fan shroud and positioned adjacent to the inner surface of the opening, the wear ring extending inwardly from the inner surface of the opening along the radial direction, the wear ring formed from a material that is worn by the tip of the one or more blades to increase an efficiency of the fan assembly, wherein the wear ring defines a radially inner end, and wherein the radially inner end of the wear ring is formed from a material that deforms during a deformation of the fan shroud during operation of the fan assembly, said wear ring being molded as a single circular piece to form a continuous circular inner surface.

2. The fan assembly of claim 1, wherein the wear ring defines a radially inner end, the radially inner end that is worn down by the tips of the blades through repeated contact with the tips of the one or more blades.

3. The fan assembly of claim 2, wherein the rotor and the blades comprise a fan, the fan defining a diameter, and wherein the radially inner end of the wear ring defines a clearance in the radial direction with the tips of the one or more blades, the clearance being less than two percent of the diameter of the fan.

4. The fan assembly of claim 1, wherein the wear ring is formed by injection molding.

5. The fan assembly of claim 1, wherein the wear ring defines a base, and wherein the base defines a U-shaped cross-section attached to the fan shroud.

6. The fan assembly of claim 1, wherein the wear ring is attached to the fan shroud using a plurality of rivets.

7. The fan assembly of claim 1, wherein the wear ring is comprised of a thermoplastic polyethylene.

8. The fan assembly of claim 1, wherein the wear ring is comprised of an ultra-high molecular weight polyethylene.

9. The fan assembly of claim 1, wherein the wear ring is formed from a material wearing gradually when contacted with the tip of one or more of the blades.

10. The fan assembly of claim 1, wherein the wear ring defines a width along the axial direction that is greater than a width of the blades along the axial direction, and wherein the wear ring is moveably attached to the fan shroud.

* * * * *